July 2, 1929.                    C. HUFSCHMIDT                    1,719,548
                  WATER SOFTENING FILTER AND PROCESS OF
                    REGENERATING AND PURIFYING THE SAME
                           Filed July 27, 1927
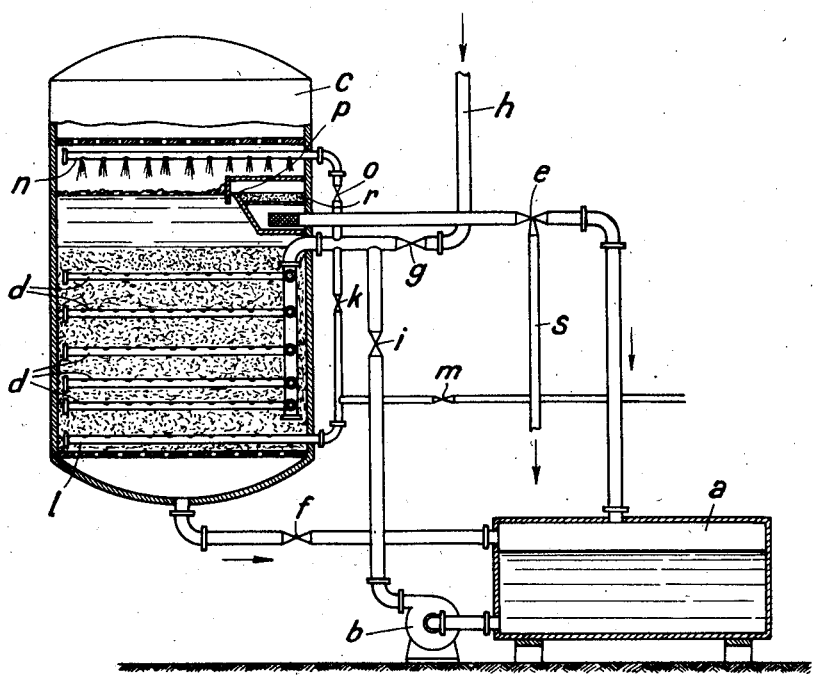
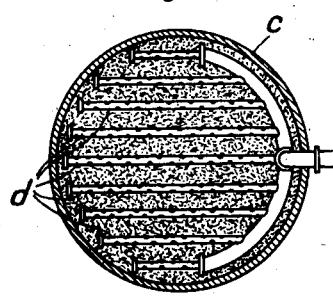
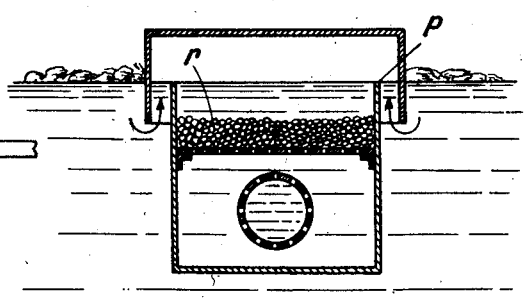
Inventor:
Carl Hufschmidt Patented July 2, 1929.

1,719,548

UNITED STATES PATENT OFFICE.

CARL HUFSCHMIDT, OF WESTENFELD, NEAR WATTENSCHEID, GERMANY.

WATER-SOFTENING FILTER AND PROCESS OF REGENERATING AND PURIFYING THE SAME.

Application filed July 27, 1927, Serial No. 208,818, and in Germany February 5, 1926.

The invention relates to water-softening filters of the kind in which the filtering material effects an interchange of chemical bases, as of sodium and calcium in permutite filters. For regenerating and purifying such filters the common method is to fill the same with liquid, say a solution of common salt, and leave the liquid therein for some hours, whereupon it is discharged. A somewhat more elaborate method which has been adopted consists in effecting the regeneration in layers, from which the solution is drawn off separately, but this method requires very much care. Both these methods require considerable time, so that to avoid long interruptions of service an additional installation must be provided, and generally the salt solution used is not capable of being used again.

To remove these defects I effect the regeneration and purifying by means of liquid in motion, instead of by liquid at rest, and for this purpose cause the regenerating liquid to circulate through the filter. This not only greatly accelerates the process, but renders the effect more thorough and uniform. I may, at the beginning of the process, discharge a small quantity of the regenerating liquid, to carry away the dirt which it has washed out of the filter, and I am then able to re-use the remaining liquid. For introducing the regenerating liquid into the filtering column I prefer to use perforated pipes arranged in tiers within the column, so that the resistance to the flow of liquid is much less than if the whole of the liquid were introduced at the bottom, and there is less disturbance of the filtering material by the circulating liquid, and the latter acts more uniformly on the granules. I may use the same perforated pipes for introducing the crude water into the filtering column when the filter is in normal operation, obtaining in this case also the advantage of reduced resistance to flow, and reduced disturbance of the filtering material, and being incidentally enabled to use a filtering column of substantially increased height.

For occasional "boiling" of the filter with a suitable liquid such as dazitol I may provide a perforated pipe, or tier of pipes, embedded in a silica layer at the bottom of the column, and I may provide a tier of perforated pipes above the column, for spraying the top surface of the liquid, for a purpose which will be described hereinafter.

An example of apparatus according to the invention is shown in the accompanying drawing, in which, Fig. 1 is a sectional elevation thereof, and
Fig. 2 is a partial plan view, in section,
Fig. 3 showing in section a detail, to a larger scale.

There is a tank $a$ for the salt solution, which is forced by a pump $b$ into the permutite filter $c$, the latter containing tiers of perforated delivery tubes $d$, through which the solution is propelled into the permutite, washing the granules and loosening the mass. As the solution rises in the filter it carries the dirt with it, for discharge through a waste pipe $s$ controlled by a three-way cock $e$. When the top layer of solution, carrying the dirt and also a large proportion of water-hardening compounds, has been discharged, the cock $e$ is turned to cut off the discharge through the pipe $s$, and the solution then flows back to the tank $a$ whence it is pumped back to the filter, and kept in circulation as required.

With this method the process of regenerating is much accelerated, being, in a typical case, completed in half an hour, whereas formerly nine hours were required. Then the pump is stopped, and a valve $f$ is opened, allowing the solution in the filter to flow back to the tank $a$. The slime and particles of water-hardeners having been discharged at the beginning, the remaining salt solution can be re-used.

The crude water is supplied to the filter at appropriate pressure through a pipe $h$ controlled by a valve $g$. A valve $i$ in the delivery pipe of the pump $b$, which joins the pipe $h$, is at this stage closed. The pipe $h$ delivers the crude water into the filtering mass through the tubes $d$.

For occasional "boiling" of the filter there is a steam pipe controlled by a valve $m$ and leading to a bank of perforated tubes $l$ close to the bottom of the filtering column. Before steam is introduced the filter may be filled with a solution of dazitol, which is heated by the steam.

A branch pipe controlled by a valve $k$ connects the tubes $l$ to the water pipe $h$, so that the tubes $l$ can be used also for introducing crude water into the filter.

It is a common experience, with permutite filters, that some of the permutite is lost during the process of regeneration, owing to some of the permutite frothing up with the dirt or slime, and being discharged with the same. To prevent or reduce such loss I provide at the top of the filtering column a tier of perforated tubes $n$, located above the outlet to the pipe $s$ and connected to the pipe $h$ by a pipe controlled by a valve $o$. The connecting pipe joins the pipe $h$ between the filter and the valve $g$, so that if the valve $o$ is opened while the pump $b$ is working solution is sprayed on to the froth or scum and washes out the particles of permutite. As an additional safeguard I provide at the outlet a froth trap $p$, best shown in Fig. 3, with a filter $r$ adapted to retain permutite, the froth trap having an overhanging cover, which obstructs the entrance of froth and compels liquid from the top of the column to take first a downward and then an upward course, in order to reach the outlet, as indicated by arrows in Fig. 3.

What I claim as my invention and desire to secure by Letters Patent of the United States is:—

1. A water softening filter, comprising a container for filtering material, tiers of perforated tubes in said container, a tank for solution, a water supply pipe connected to said perforated tubes and having a cut-off valve, a pipe connecting the container with the tank and provided with a cut-off valve, a pipe connecting the container at an elevated point with the tank and having a waste pipe, a three-way valve between said connecting pipe and said waste pipe, perforated pipes in the upper and lower portions of the container and having a valved connecting pipe, a valved steam pipe connected to said connecting pipe, a pump, a valved pipe connecting the delivery side of said pump to said water supply pipe and a pipe connecting the suction side of said pump to said tank.

2. A water softening filter, comprising a container for filtering material, tiers of perforated tubes in said container, a tank for solution, an outlet pipe connecting the container at an elevated point to the tank, a waste pipe leading from said outlet pipe, a three-way valve to control said pipes, a pump, a water supply pipe to said perforated tubes in the container, a valved pipe connecting the delivery side of the pump to said water supply pipe, a pipe connecting the tank with the suction side of said pump, perforated tubes in the container, means for connecting said first mentioned tubes to the delivery side of the pump, and a froth trap, including a filter, including the intake end of said outlet pipe.

In witness whereof I have signed this specification.

CARL HUFSCHMIDT.